July 11, 1933.  J. J. GROETKEN  1,917,710
FLOW METER
Filed Oct. 10, 1930
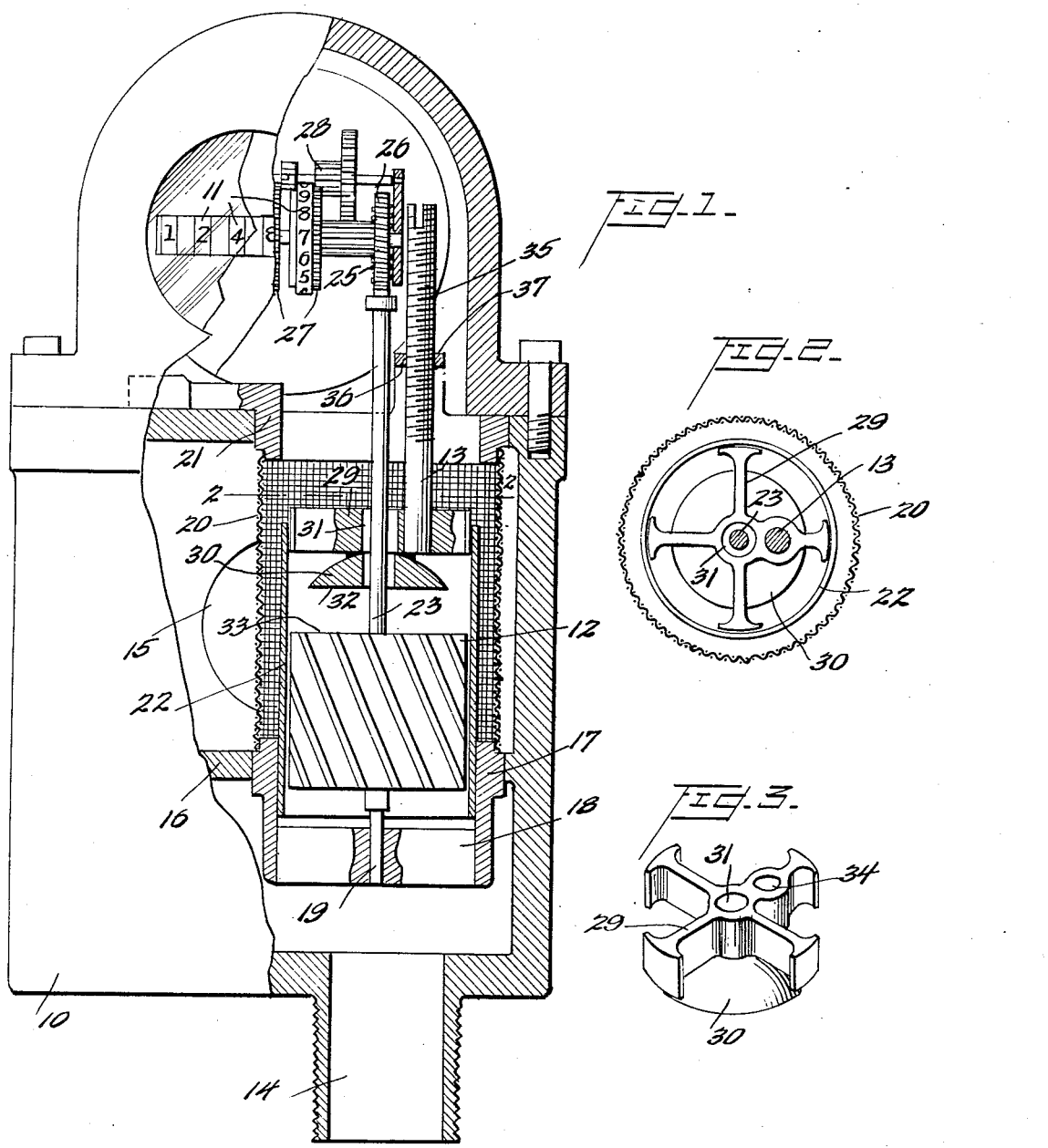
Inventor
Joseph J. Groetken
By Wm. D. Shoemaker
Attorney

Patented July 11, 1933

1,917,710

UNITED STATES PATENT OFFICE

JOSEPH J. GROETKEN, OF AURORA, ILLINOIS

FLOW METER

Application filed October 10, 1930. Serial No. 487,869.

This invention has relation to a flow meter, and more particularly to such a meter in which the flow to the meter-actuating turbine is susceptible of accurate and minute adjustment whereby the amount of liquid permitted to pass may be accurately registered by the meter.

The object of the invention is to provide an accurate measuring instrument of the type described. A further object is to provide means whereby an adjustment may be made of the flow through the meter-actuating turbine.

Other objects of the invention will hereinafter appear in the following description and the novel features thereof will be particularly pointed out in the appended claims.

Like reference numerals indicate like parts throughout the several figures of the drawing, in which Fig. 1 is a side elevation of a meter casing which has been shown broken away to exhibit in cross section the operating parts of the invention, Fig. 2 is a cross section upon the line 2—2 of Fig. 1, and Fig. 3 is a view in perspective of the adjustment gate.

The invention may be described as consisting of a casing 10, a register 11, a turbine 12, and an adjustable regulator 13 for said turbine. These parts will now be described in detail and subsequently their particular relationship to each other will be set forth.

The casing 10 is conventional and shows an outlet 14 through which the measured liquid passes, and an inlet 15 through which the liquid is admitted into the body of the casing. The partition 16 across the casing has mounted in it a thimble 17 at the bottom of which is a spider 18 formed with the bearing 19 for the lower end of a turbine shaft. A sieve 20 of usual construction extends from the thimble to a collar 21 and completely surrounds the turbine mechanism so that any liquid passing into the inlet 15 will be required to pass through this sieve before it can reach the outlet 14.

A sleeve 22 is mounted in a secure manner in the thimble 17 and this sleeve encloses the turbine rotor 12 mounted upon the turbine shaft 23. It will be appreciated that the turbine rotor has any required number of vanes disposed thereon in a spiral manner so that liquid passing downward from the upper portion of the sleeve will impinge upon these vanes and cause a rotation of the rotor which in turn will cause the shaft 23 to rotate.

The shaft 23 through any desirable mechanical association of parts is designed to actuate the register 11. The construction of the register 11 as shown herein is conventional, but it is illustrated as comprised in a screw 25 on the upper end of a shaft 23 meshing with a worm gear 26 which in turn actuates the indicating discs 27 and the mechanism 28, all as will be well understood by one skilled in the art.

The rotor 12 has a very limited amount of vertical play. Within the sleeve 22 and above the rotor 12 is mounted an adjusting gate comprising a spider-like member 29 which has secured thereto the dome-shaped gate 30. Centrally of these two members are aligned openings 31 through which the shaft 23 extends and without obstruction. The spider and gate may be lowered or lifted within the sleeve 22 in order to enlarge or decrease the amount of effective area between the lower face 32 of the gate and the upper face 33 of the rotor whereby the flow of liquid may be retarded or promoted as found desirable. It will be appreciated too that some fluid will descend to the rotor through the aligned apertures 31 in the spider and in the gate and that a lowering or raising of the spider and gate will cause a slight difference in flow through these apertures to the rotor. It will be appreciated that the rotor is in the form of a drum with the vanes on the outer face of the drum.

For the purpose of controlling the relative position of the rotor with respect to the spider and gate, there is provided in the spider an aperture 34 in which is secured the lower end of the adjusting screw 35 in such a manner that it may rotate within the spider but may not be removed therefrom. This screw is supported near its central portion in a threaded aperture 36 in a cross-bar 37 mounted upon the collars 21. It will be appreciated that when the screw 35 is rotated it will change the relative position of the spider and gate with respect to the rotor and that this change of position is the means whereby the accurate and minute adjustment for the flow of liquid is obtained.

The functions of the several individual parts of this invention have been set forth in connection with the detailed description thereof. It remains only to recite their conjoint operation.

Liquid being admitted to the casing 10 through the opening 15 will pass through the sieve 20 and flow down within the sleeve 22 where it will rotate the rotor 12 and consequently actuate the register 11. The amount of flow of liquid is regulated by the relative position of the gate 30 with respect to the rotor 12 and this position of the gate 30 is controlled by means of the screw 35, the gate being attached rigidly to the spider, and the screw lifting and lowering the spider to obtain the proper position of the parts to correspond accurately with the movements of the register.

What is claimed is:

1. A flow meter comprising a casing having an inlet and an outlet and a horizontal partition wall, an imperforate sleeve mounted vertically in the partition wall and adapted to constitute a conduit through which the liquid passes, a rotor mounted at the lower end of said sleeve and adapted to be rotated upon the passage of liquid, a register, a transmitting mechanism between the rotor and the register, a regulator mounted at the upper end of said imperforate sleeve and adapted to be adjustably mounted in said casing toward and from the rotor to decrease or increase the amount of fluid flowing to said rotor, and means for adjusting the regulator manually.

2. The flow meter of claim 1 including a cylindrical screen surrounding said imperforate sleeve and through which the liquid must pass before passing through the imperforate sleeve.

In testimony whereof I affix my signature.

JOSEPH J. GROETKEN.